(12) United States Patent
Wu (10) Patent No.: US 8,361,624 B2
(45) Date of Patent: Jan. 29, 2013

(54) SPIRODILACTAM POLYCARBONATE INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/114,674

(22) Filed: May 24, 2011

(65) Prior Publication Data

US 2012/0301725 A1 Nov. 29, 2012

(51) Int. Cl.
*B32B 27/28* (2006.01)

(52) U.S. Cl. ........ 428/412; 428/422; 428/447; 428/448; 428/473.5

(58) Field of Classification Search .................. 428/412, 428/422, 447, 448, 473.5
See application file for complete search history.

(56) References Cited

U.S. PATENT DOCUMENTS

| | | | |
|---|---|---|---|
| 4,828,904 A * | 5/1989 | Shiraishi et al. ............. 428/32.7 |
| 4,906,725 A * | 3/1990 | Wang ............................ 528/201 |
| 5,030,707 A * | 7/1991 | Wang ............................ 528/203 |
| 5,487,707 A | 1/1996 | Sharf et al. |
| 5,525,446 A * | 6/1996 | Sypula et al. ................. 430/47.4 |
| 6,139,784 A | 10/2000 | Oshima et al. |
| 6,318,223 B1 | 11/2001 | Yu et al. |
| 6,440,515 B1 | 8/2002 | Thornton et al. |
| 6,602,156 B2 | 8/2003 | Schlueter, Jr. |
| 7,031,647 B2 | 4/2006 | Mishra et al. |
| 7,130,569 B2 | 10/2006 | Goodman et al. |
| 7,139,519 B2 | 11/2006 | Darcy, III et al. |
| 7,920,813 B2 | 4/2011 | Inada et al. |
| 7,923,084 B2 | 4/2011 | Kurachi et al. |
| 2007/0082147 A1 * | 4/2007 | Teranishi et al. .......... 428/32.66 |
| 2008/0240802 A1 * | 10/2008 | Nakura ......................... 399/313 |

OTHER PUBLICATIONS

Polyspirodilactam: A new family of high temperature polymers Pen-Chung, Wang; Asbell, William J; Chuah, Hoe H; Gergen, William P Polymer Engineering and Science; Mid-Jan. 1994; 34, 1; ProQuest Central.*

* cited by examiner

*Primary Examiner* — Callie Shosho
*Assistant Examiner* — John Freeman
(74) *Attorney, Agent, or Firm* — Eugene O. Palazzo (57) ABSTRACT

An intermediate transfer member that includes spirodilactam polycarbonates, mixtures of spirodilactam polycarbonates or copolymers of spirodilactam polycarbonates, an optional polysiloxane, and an optional conductive filler component.

14 Claims, 1 Drawing Sheet

SPIRODILACTAM POLYCARBONATE INTERMEDIATE TRANSFER MEMBERS

This disclosure is generally directed to an intermediate transfer member that includes spirodilactam polycarbonates, such as an intermediate transfer member that is comprised of a mixture of a spirodilactam polycarbonate, an optional polysiloxane, and an optional conductive component.

BACKGROUND

Intermediate transfer members, such as intermediate transfer belts selected for transferring a developed image in xerographic systems, are known. For example, there are known a number of intermediate transfer members that include materials of a low unacceptable modulus or break strength, poor release characteristics from metal substrates, or which members are costly to prepare primarily because of the cost or scarcity of raw materials and lengthy drying times. Also known are various intermediate transfer members with characteristics that cause these members to become brittle resulting in inadequate acceptance of the developed image, and subsequent partial transfer of developed xerographic images to a substrate like paper.

A disadvantage relating to the preparation of an intermediate transfer member is that there is usually deposited a separate release layer on a metal substrate, and thereafter, there is applied to the release layer the intermediate transfer member components, and where the release layer allows the resultant intermediate transfer member to be separated from the metal substrate by peeling or by the use of mechanical devices. Thereafter, the intermediate transfer member is in the form of a film, which can be selected for xerographic imaging systems, or the film can be deposited on a supporting substrate like a polymer layer. The use of a release layer adds to the cost and time of preparation, and such a layer can modify a number of the intermediate transfer member characteristics.

For low end xerographic machines and printers that produce about 30 pages or less per minute, thermoplastic intermediate transfer members are usually used because of their low cost. However, the modulus values or break strength of thermoplastic materials, such as certain polycarbonates, polyesters, and polyamides, are relatively low of for example, from about 1,000 to 2,000 Mega Pascals (MPa).

High end xerographic machines and printers that generate at least 30 pages per minute, and up to about 75 pages per minute or more usually utilize intermediate transfer members of thermoplastic polyimides, thermosetting polyimides, or polyamideimides, primarily because of their high modulus of about 3,500 Mpa or more. However, intermediate transfer members using these materials are more expensive in that both the raw material cost and the manufacturing process cost are higher than using thermoplastic or thermoset polyimides or polyamideimides. Thus, an economical intermediate transfer member possessing high modulus and excellent release characteristics for high end machines is desired.

There is a need for intermediate transfer members that substantially avoid or minimize the disadvantages of a number of known intermediate transfer members.

Also, there is a need for intermediate transfer members with excellent break strengths as determined by their modulus measurements, are readily releasable from substrates, possess high glass transition temperatures, such as greater than about 200° C. like from about 210° C. to about 400° C., and from about 215° C. to about 375° C., and which members possess improved stability with no or minimal degradation for extended time periods.

Moreover, there is a need for intermediate transfer member materials that possess rapid release characteristics from a number of substrates that are selected when such members are prepared.

Another need relates to providing seamless intermediate transfer members that have excellent conductivity or resistivity, and that possess acceptable humidity insensitivity characteristics leading to developed images with minimal resolution issues.

Further, there is a need for seamless intermediate transfer members containing components that can be economically and efficiently manufactured.

These and other needs are achievable in embodiments with the intermediate transfer members and components thereof disclosed herein.

BACKGROUND

Disclosed is an intermediate transfer member comprising a polymer layer comprising a spirodilactam polycarbonate.

Also disclosed is an intermediate transfer member comprising a mixture of a copolymer of a spirodilactam polycarbonate and a polycarbonate, a polysiloxane, and a conductive filler component, and wherein the copolymer is represented by the following formulas/structures, or mixtures thereof wherein x is from about 5 to about 30 mole percent, and y is from about 70 to about 95 mole percent.

Further disclosed is an intermediate transfer member comprising a mixture of a copolymer of a spirodilactam polycarbonate and a polycarbonate, a polysiloxane, and a conductive filler component, and wherein the member possesses a modulus of from about 3,000 to about 5,500 Mega Pascals, and which mixture is readily releasable from a metal substrate.

FIGURES

The following Figures are provided to further illustrate the intermediate transfer members disclosed herein.

EMBODIMENTS

There is provided herein an intermediate transfer member comprising a spirodilactam based polycarbonate that enables or assists in enabling efficient release from a substrate, such as stainless steel, thereby avoiding the need for a separate release layer on the substrate.

More particularly, there is provided herein a seamless intermediate transfer member comprising a mixture in the configuration of a polymer layer, of a spirodilactam polycarbonate, a filler or conductive component, and a polysiloxane.

Also, there is illustrated herein a seamless intermediate transfer member comprising a mixture of a spirodilactam based polycarbonate comprised of a copolymer of a spirodilactam polycarbonate and a polycarbonate, a polysiloxane, and a conductive filler component, and an optional release layer.

Figure 1:
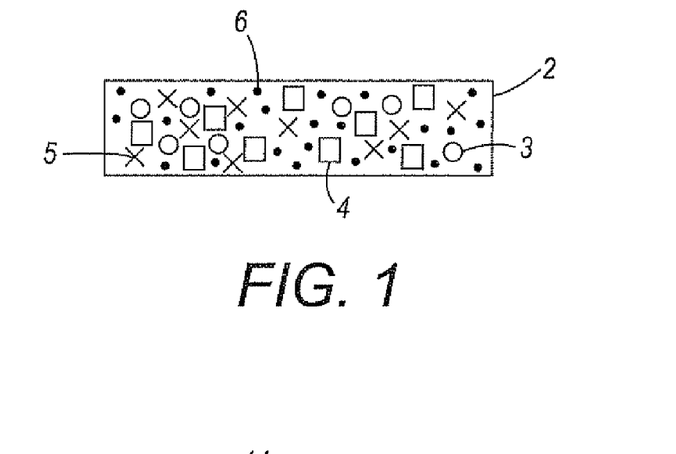
FIG. 1 illustrates an exemplary embodiment of a one-layer intermediate transfer member of the present disclosure.

In FIG. 1 there is illustrated an intermediate transfer member comprising a layer 2 comprised of a spirodilactam polycarbonate 3, or a mixture of a spirodilactam polycarbonate, such as a copolymer of a spirodilactam polycarbonate and a polycarbonate 4, an optional siloxane polymer 5, and an optional conductive component 6.

Figure 2:
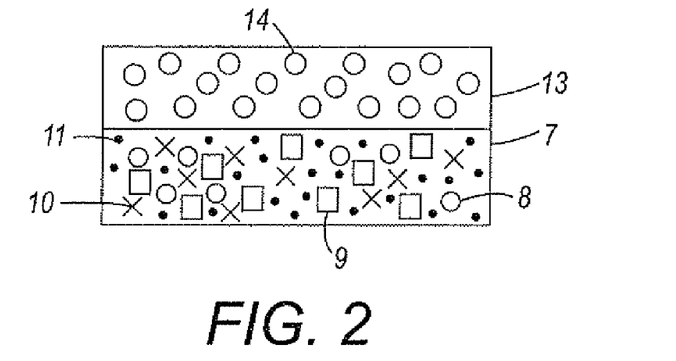
FIG. 2 illustrates an exemplary embodiment of a two-layer intermediate transfer member of the present disclosure.

In FIG. 2 there is illustrated a two-layer intermediate transfer member comprising a bottom layer 7 comprising a spirodilactam polycarbonate 8, or a mixture of a spirodilactam polycarbonate, such as a copolymer of a spirodilactam polycarbonate 8 and a polycarbonate 9, a siloxane polymer 10, and a conductive component 11, and an optional top or outer toner release layer 13 comprising release components 14.

Figure 3:
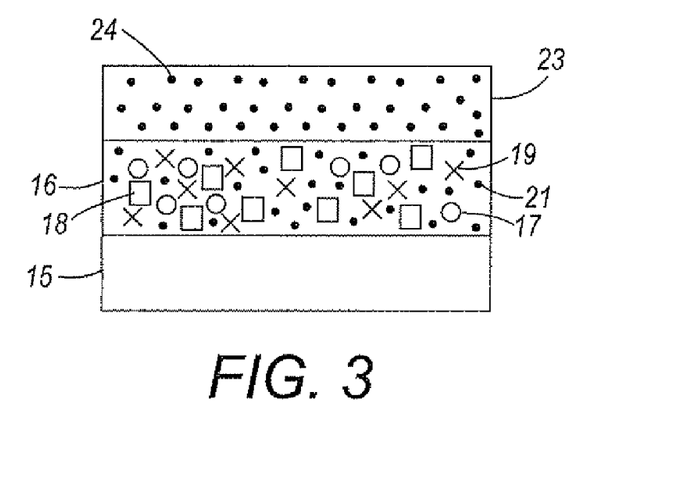
FIG. 3 illustrates an exemplary embodiment of a three-layer intermediate transfer member of the present disclosure.

In FIG. 3 there is illustrated a three-layer intermediate transfer member comprising a supporting substrate 15, a layer thereover 16 comprising a spirodilactam polycarbonate 17, or a mixture of a spirodilactam polycarbonate, such as a copolymer of a spirodilactam polycarbonate 17 and a polycarbonate 18, an optional siloxane polymer 19, and an optional conductive component 21, and an optional release layer 23 comprising release components 24.

The intermediate transfer members disclosed herein exhibit excellent release characteristics (self release), and where the use of an external release layer present on, for example, a stainless steel substrate is avoided; have excellent mechanical strength while permitting the rapid and complete transfer, such as from about 90 to about 99 percent, or from about 95 to about 100 percent transfer of a xerographic developed image; possess a Young's modulus of, for example, from about 3,000 to about 7,000 Mega Pascals (MPa), from about 3,000 to about 5,500 MPa, from about 3,600 to about 6,000 MPa, from about 3,500 to about 5,000 MPa, from about 3,000 to about 5,000 MPa, from about 4,800 to about 5,000 MPa, or from about 3,700 to about 4,000 MPa; a high glass transition temperature ($T_g$) of from about 200 to about 400° C., from about 250 to about 375° C., or from about 215 to about 375° C.; a CTE (coefficient of thermal expansion) of from about 20 to about 70 ppm/° K (parts per million per degree Kelvin), or from about 30 to about 60 ppm/° K; and an excellent resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, or from about $10^{19}$ to about $10^{12}$ ohm/square. The resistivity of the disclosed intermediate transfer members can be adjusted by varying the concentration of the conductive particles.

Self-release characteristics without the assistance of any external sources, such as prying devices, permit the efficient, economical formation, and full separation, such as from about 95 to about 100 percent, or from about 97 to about 99 percent separation of the disclosed intermediate transfer members from substrates, such as steel, upon which the members are initially prepared in the form of a film. Self-release also avoids the need for release materials and separate release layers on the metal substrates. The time period to obtain the self-release characteristics varies depending, for example, on the components selected for the spirodilactam polycarbonates disclosed herein. Generally, however, this time period is from about 1 to about 60 seconds, such as from about 1 to about 35 seconds, from about 1 to about 15 seconds, from about 1 to about 10 seconds, or from 1 to about 5 seconds, and in some instances less than about 1 second.

The intermediate transfer members of the present disclosure can be provided in any of a variety of configurations, such as a one-layer configuration, or in a multi-layer configuration, including, for example, a top release layer. More specifically, the final intermediate transfer member may be in the form of an endless flexible belt, a web, a flexible drum or roller, a rigid roller or cylinder, a sheet, a drelt (a cross between a drum and a belt), an endless seamed flexible belt, a seamless belt (that is with an absence of any seams or visible joints in the members), and the like.

Spirodilactam Polycarbonates

The intermediate transfer members herein comprise a polymer layer comprising a spirodilactam polycarbonate. The spirodilactam polycarbonate can be, for example, a polymer formed entirely or almost entirely from spirodilactam carbonate monomers, a copolymer formed entirely or almost entirely from spirodilactam carbonate monomers and carbonate monomers, or a copolymer, terpolymer, or the like formed from spirodilactam carbonate monomers, carbonate monomers, and other monomers. Unless otherwise indicated, all of these variations are referred to generally herein as spirodilactam polycarbonates. Thus, for example, spirodilactam polycarbonates include spirodilactam based polycarbonates, or copolymers of the spirodilactam polycarbonates and polycarbonates.

Examples of spirodilactam polycarbonates, available from Shell Development Company, Houston Tex., and which, in embodiments, are comprised of spirodilactam based polycarbonates, such as a copolymer of a spirodilactam polycarbonate and a polycarbonate, and selected for the intermediate transfer members illustrated herein are represented by at least one of the following formulas/structures wherein x and y represent mole percents, and where the sum of x and y thereof is 100 mole percent.

More specifically, in the above formulas/structures x is from about 1 to about 30 mole percent, from about 5 to about 30 mole percent, from about 6 to about 25 mole percent, from about 6 to about 20 mole percent, from about 2 to about 20 mole percent, from about 1 to about 5 mole percent, from about 3 to about 10 mole percent, or other suitable mole percents, and y is, for example, from about 70 to 99 mole percent, from about 70 to about 95 mole percent, from about 80 to about 98 mole percent, from about 99 to about 95 mole percent, from about 90 to about 97 mole percent, from about 80 to about 94 mole percent, from about 75 to about 94 mole percent, or other suitable mole percents. The spirodilactam polycarbonates have, for example, a weight average molecular weight of from about 50,000 to about 300,000, from about 100,000 to about 250,000, from about 75,000 to about 200,000, or from about 150,000 to about 200,000 as determined by known analytic processes, such as by Gel Permeation Chromatography (GPC) analysis.

Mole percent, or molar percent, refers in embodiments of the present disclosure to the ratio of the moles of the specific monomer to the total moles of the monomers in the polymer.

While not being desired to be limited to the processes that may be utilized for the preparation of the spirodilactam polycarbonates, it is believed that they are formed by reacting a spirodilactam, a bisphenol, and phosgene, where the spirodilactam reacts with the phosgene to form the spirodilactam polycarbonate, and bisphenol reacts with the phosgene to form the polycarbonate. Based on the ratio of the spirodilactam and the bisphenol selected, and the amount of phosgene, the x and y mole ratios of the polymer or copolymer of the formulas/structures illustrated herein can be determined.

Examples of spirodilactams selected for the formation of the polymers of the formulas/structures illustrated herein include, for example, 1,6-di(4-hydroxyphenyl)-1,6-diazoaspiro[4.4]nonane-2,7-dione, 1,6-di(4-hydroxyphenyl)-3,4,8,9-tetrafluoro-1,6-diazoaspiro[4.4]nonane-2,7-dione, 1,6-di(3-hydroxy-4-chlorophenyl)-3,3,4,4,8,8,9, or 9-octylmethyl-1,6diazoaspiro-4,4-nonane-2,7-dione.

Examples of bisphenols include, for example, bisphenol A, bisphenol Z, bisphenol C, bisphenol F, bisphenol S, and the like, or mixtures thereof.

The spirodilactam polycarbonates can be present in the intermediate transfer member in an amount of about 100 percent. In embodiments, the spirodilactam polycarbonates, inclusive throughout of spirodilactam based polycarbonates, or copolymers of the spirodilactam polycarbonates and polycarbonates, can be present in the intermediate transfer member in the ratios as illustrated herein, and in various effective amounts, such as for example, from about 50 to about 90 weight percent, from about 70 to about 85 weight percent, from about 65 to about 95 weight percent, from about 60 to about 95 weight percent, from about 80 to about 90 weight percent, or from about 80 to about 85 weight percent, based on the total of components or ingredients present.

The spirodilactam polycarbonates can be present in the intermediate transfer member in an amount of up to about 100 percent. In embodiments, the spirodilactam polycarbonate can be present in the polymer layer of the intermediate transfer member in the ratios as illustrated herein, and in various effective amounts, such as for example, from about 50 to about 90 weight percent, from about 70 to about 85 weight percent, from about 65 to about 95 weight percent, from about 60 to about 95 weight percent, from about 80 to about 90 weight percent, or from about 80 to about 85 weight percent, based on the total of components or ingredients present in the polymer layer.

The mixtures of the spirodilactam polycarbonate, conductive filler, and polysiloxane are present in the amounts and ratios indicated herein. Exemplary ratios include about 80/19.95/0.05, about 85/14.95/0.05, or about 90/9.9/0.1, or any amounts between those ratios.

Polysiloxane Polymers

The intermediate transfer member can also generally comprise a polysiloxane polymer. Examples of polysiloxane polymers selected for the intermediate transfer members disclosed herein include known suitable polysiloxanes, such as a copolymer of a polyether and a polydimethylsiloxane, commercially available from BYK Chemical as BYK® 333, BYK® 330 (about 51 weight percent in methoxypropylacetate), and BYK® 344 (about 52.3 weight percent in xylene/isobutanol, ratio of 80/20); BYK®-SILCLEAN 3710 and BYK® 3720 (about 25 weight percent in methoxypropanol); a copolymer of a polyester and a polydimethylsiloxane, commercially available from BYK Chemical as BYK® 310 (about 25 weight percent in xylene), and BYK® 370 (about 25 weight percent in xylenelalkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester polyether and a polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be included in the polymer layer mixtures in various effective amounts, such as from about 0.01 to about 1 weight percent, from about 0.05 to about 1 weight percent, from about 0.05 to about 0.5 weight percent, from about 0.1 to about 0.5 weight percent, or from about 0.1 to about 0.3 weight percent based on the total weight of the components or ingredients present.

Optional Fillers

Optionally, the intermediate transfer member may contain one or more fillers to, for example, alter and adjust the conductivity of the intermediate transfer member. Where the intermediate transfer member is a one layer structure, the conductive filler can be included in the mixture of the spirodilactam polycarbonate disclosed herein. However, where the intermediate transfer member is a multi-layer structure, the conductive filler can be included in one or more layers of the member, such as in the supporting substrate, the polymer layer, or mixtures thereof coated thereon, or in both the supporting substrate and the polymer layer.

Any suitable filler can be used that provides the desired results. For example, suitable fillers include carbon blacks, metal oxides, polyanilines, graphite, acetylene black, fluorinated carbon blacks, other known suitable fillers, and mixtures of fillers.

Examples of carbon black fillers that can be selected for the intermediate transfer members illustrated herein include special black 4 (B.E.T. surface area=180 m$^2$/g, DBP absorption=1.8 ml/g, primary particle diameter=25 nanometers) available from Evonik-Degussa, special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS ° 200 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer members are PANIPOLIM F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer members include, for example, tin oxide, antimony doped tin oxide, antimony dioxide, titanium dioxide, indium oxide, zinc oxide, indium-doped tin trioxide, indium tin oxide, and titanium oxide.

Suitable antimony doped tin oxides include those antimony doped tin oxides coated on an inert core particle (e.g., ZELEC® ECP-S, M and T), and those antimony doped tin oxides without a core particle (e.g., ZELEC® ECP-3005-XC and ZELEC® ECP-3010-XC; ZELEC® is a trademark of DuPont Chemicals, Jackson Laboratories, Deepwater, N.J.). The core particle may be mica, TiO$_2$ or acicular particles having a hollow or a solid core.

The antimony doped tin oxide particles can be prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC® ECP-T), and a plate shaped mica core product (ZELEC® ECP-M).

When present, the filler can be selected in an amount of, for example, from about 0.1 to about 50 weight percent, from about 1 to about 60 weight percent, from about 1 to about 40 weight percent, from about 3 to about 40 weight percent, from about 4 to about 30 weight percent, from about 10 to about 30 percent, from about 10 to about 20 weight percent, or from about 5 to about 20 weight percent based on the total of the ingredients in which the filler is included.

Optional Additional Polymers

In embodiments of the present disclosure, the intermediate transfer member polymer layer can further include an optional polymer that primarily functions as a binder. Examples of suitable additional polymers include a polyamideimide, a polyimide, a polyetherimide, a polycarbonate, a polyphenylene sulfide, a polyamide, a polysulfone, a polyetherimide, a polyester, a polyvinylidene fluoride, a polyethylene-co-polytetrafluoroethylene, and the like, and mixtures thereof.

When an additional polymer is selected, it can be included in the intermediate transfer member in any desirable and effective amounts. For example, the additional polymer can be present in an amount of from about 1 to about 75 weight percent, from about 2 to about 45 weight percent, or from about 3 to about 15 weight percent, based on a total of the ingredients.

Optional Supporting Substrates

If desired, a supporting substrate can be included in the intermediate transfer member, such as beneath the polymer layer. The supporting substrate can be included to provide increased rigidity or strength to the intermediate transfer member.

The coating dispersion of the spirodilactam polycarbonate can be coated on any suitable supporting substrate material to form a dual layer intermediate transfer member. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R1; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_o$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, from about 75 to about 125 microns, from about 80 to about 105 microns, or from about 80 to about 90 microns.

Optional Release Layer

When desired, an optional release layer can be included in the intermediate transfer member, such as in the configuration of a layer over the polymer layer. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, about 10 to about 75 microns, or from about 20 to about 50 microns.

The optional release layer can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON OF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene- 1,1,1-dihydro-3-bromoperfluoropropene-1, or any other suitable, known, commercially available cure site monomers.

Intermediate Transfer Member Formation

The spirodilactam polycarbonate intermediate transfer member, or the mixtures illustrated herein comprising a spirodilactam polycarbonate, a polysiloxane, and an optional conductive filler component, can be formulated into an intermediate transfer member by any suitable method. For example, with known milling processes, uniform dispersions of the spirodilactam polycarbonate, or the intermediate transfer member mixtures can be obtained, and then coated on individual metal substrates, such as a stainless steel substrate or the like, using known draw bar coating or flow coating methods. The resulting individual film or films can be dried by heating at, for example, from about 100° C. to about 400° C., from about 160° C. to about 320° C., or from about 125° C. to about 190° C., for a suitable period of time, such as from about 20 to about 180 minutes, from about 40 to about 120 minutes, or from about 25 to about 35 minutes while remaining on the substrates. More specifically, the films formed can be cured by heating at 125° C. for 30 minutes, 190° C. for 30 minutes, and 320° C. for 60 minutes.

After drying and cooling to room temperature, about 23° C. to about 25° C., the films readily release from the steel substrates. That is, the films obtained immediately release, such as for example within from about 1 to about 15 seconds, from about 5 to about 15 seconds, or from about 5 to about 10 seconds, without any external assistance. The resultant intermediate transfer film product can have a thickness of, for example, from about 30 microns to about 400 microns, from about 15 to about 150 microns, from about 20 to about 100 microns, from about 50 microns to about 200 microns, from about 70 microns to about 150 microns, or from about 25 to about 75 microns.

As metal substrates selected for the deposition of the mixture disclosed herein, there can be selected stainless steel, aluminum, nickel, copper, and their alloys, glass plates, and other conventional typical known materials.

Examples of solvents selected for formation of the intermediate transfer member mixtures, which solvents can be selected in an amount of, for example, from about 60 to about 95 weight percent, or from about 70 to about 90 weight percent of the total mixture ingredients, include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent based on the weight of the solvent and the diluent are known diluents like aromatic hydrocarbons, ethyl acetate, acetone, cyclohexanone and acetanilide.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

In an image on image transfer, the color toner images are first deposited on the photoreceptor and all the color toner images are then transferred simultaneously to the intermediate transfer member disclosed herein. In a tandem transfer, the toner image is transferred one color at a time from the photoreceptor to the same area of the intermediate transfer member illustrated herein.

Specific embodiments will now be described in detail. These examples are intended to be illustrative, and are not limited to the materials, conditions, or process parameters set forth in these embodiments. All parts are percentages by weight of total solids of all the components unless otherwise indicated.

COMPARATIVE EXAMPLE 1

A coating composition was prepared by stirring a mixture of special carbon black 4 obtained from Degussa Chemicals, a polyimide of a polyamic acid of pyromellitic dianhydride/4,4'-oxydianiline available as PYRE-M.L.® RC-5019 from Industrial Summit Technology, and the polyester modified polydimethylsiloxane, available as BYK® 333 from BYK Chemical, in a ratio of 14/85.95/0.05 based on the initial mixture feed amounts, in N-methyl-2-pyrrolidone (NMP), about 13 weight solids. The obtained intermediate transfer member dispersion was coated on a stainless steel substrate of a thickness of 0.5 millimeter, and subsequently the mixture was cured by heating at 125° C. for 30 minutes, 190° C. for 30 minutes, and 320° C. for 60 minutes. The resulting intermediate transfer member comprised of the above components in the ratios indicated did not release from the stainless substrate, but rather adhered to this substrate. After being immersed in water for 3 months, the intermediate transfer member film obtained eventually released from the substrate.

COMPARATIVE EXAMPLE 2

An intermediate transfer member was prepared by repeating the process of Comparative Example 1 except that the polyimide of the polyamic acid of a pyromellitic dianhydride/4,4'-oxydianiline was replaced with the polycarbonate PCZ-400 [poly(4,4'-dihydroxy-diphenyl-1-1-cyclohexane, $M_w$=40,000)], available from Mitsubishi Gas Chemical Company, and somewhat similar surface resistivity results were obtained.

EXAMPLE I

There was prepared by admixing with stirring and milling a coating composition comprising special carbon black 4, obtained from Degussa Chemical, a copolymer of a spirodilactam polycarbonate and polycarbonate A, of the following formula/structure as obtained from Shell Development Com- pany, of Houston Tex., and primarily for surface smoothness a copolymer of a polyester and a polydimethylsiloxane BYK® 333, which copolymer was obtained from BYK Chemical, in a ratio of the spirodilactam copolymer/carbon black/siloxane copolymer of 85/14.9510.05 based on the initial mixture feed amounts in N-methyl-2-pyrrolidone, about 25 weight solids.

The obtained intermediate transfer member dispersion was then coated on a stainless steel substrate of a thickness of 0.5 millimeter, and subsequently the mixture resulting was cured by heating at 160° C. for 40 minutes. The resulting intermediate transfer member, 80 microns in thickness, with a flat configuration, and with no curl comprised of the above ingredients of the spirodilactam containing copolymer/carbon black/polyester modified polydimethylsiloxane BYK 333 in a ratio of 85/14.95/0.05 readily released from the stainless steel substrate in 15 seconds without the assistance of any external processes.

The formula/structure of the above copolymer of a spirodilactam polycarbonate and polycarbonate A follows

TABLE

| | Surface Resistivity (Ohm/Sq) | Young's Modulus Mega Pascals (Mpa) | Release From Metal Substrate |
|---|---|---|---|
| Example I Spirodilactam Based Polycarbonate Intermediate Transfer Member | $1.9 \times 10^{10}$ | 4,800 | Self Released in 15 Seconds |
| Comparative Example 2 Polycarbonate Z Intermediate Transfer Member | $3.7 \times 10^{10}$ | 1,600 | Self Released In 60 Seconds |
| Comparative Example 1 Polyimide Intermediate Transfer Member | $5.4 \times 10^{10}$ | 5,000 | Did Not Release Until After Being Placed in Water for Three Months | where x is equal to 6 mole percent, y is equal to 94 mole percent, the weight average molecular $M_w$ is equal to 100,000 as determined by GPC analysis, and the glass transition temperature $T_g$ is equal to 223° C.

EXAMPLE II

An intermediate transfer member is prepared by repeating the process of Example I except there is selected as the copolymer of the above formula/structure where x is 10, 20, or 30 mole percent, y is 90, 80, or 70 mole percent, and the weight average molecular weight, $M_w$, is 150,000, 200,000, or 250,000, respectively.

MEASUREMENTS

The above intermediate transfer members of Example 1 and the Comparative Example 1 and Comparative Example 2 were measured for Young's Modulus following the known ASTM D882-97 process. Samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by dividing the load by the average cross sectional area of each of the test samples. The results are provided in the following Table.

The surface resistivity of the above intermediate transfer members of Example I, Comparative Example 1, and Comparative Example 2 were also measured using a High Resistivity Meter, and the results are provided in the following Table.

The disclosed copolymer of the spirodilactam polycarbonate and polycarbonate mixture intermediate transfer member of Example I possessed a threefold Young's modulus increase versus the Comparative Example 2 polycarbonate Z intermediate transfer member. Also, the Comparative Example 1 polyimide intermediate transfer member and the spirodilactam polycarbonate and polycarbonate intermediate transfer member of Example I possessed a comparable Young's modulus, however, the Example I intermediate transfer member self released in 15 seconds versus no self release for the Comparative Example 1 intermediate transfer member.

In addition to the Example I ratio of 85/14.95/0.05, the mixture of the spirodilactam polycarbonate, conductive filler, and polysiloxane may be present in a ratio of about 80/19.95/0.05, or about 90/9.9/0.1.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprising a polymer layer comprising a copolymer of a spirodilactam polycarbonate and a polycarbonate, wherein said copolymer is represented by the following formulas/structures wherein x from about 2 to about 20 mole percent, and v is from about 80 to about 98 mole percent, and wherein the sum of x and y is 100 mole percent; a polysiloxane, and an optional conductive filler component.

2. An intermediate transfer member in accordance with claim 1 wherein said copolymer has a weight average molecular weight of from about 50,000 to about 300,000 as determined by Gel Permeation Chromatography analysis.

3. An intermediate transfer member in accordance with claim 1 further including in contact with said polymer layer, a release layer comprising at least one ingredient selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof.

4. An intermediate transfer member in accordance with claim 1 wherein x from about 3 to about 10 mole percent, and y is from about 97 to about 90 mole percent.

5. An intermediate transfer member in accordance with claim 1 wherein said polysiloxane is a copolymer of a polyether and a polydimethylsiloxane, a copolymer of a polyester and a polydimethylsiloxane, a copolymer of a polyacrylate and a polydimethylsiloxane, or a copolymer of a polyester polyether and a polydimethylsiloxane.

6. An intermediate transfer member in accordance with claim 1 wherein said copolymer is present in an amount of from about 60 to about 95 weight percent, the polysiloxane is present in an amount of from about 0.05 to about 1 weight percent, and the conductive filler component is present in an amount of from about 1 to about 40 weight percent, with the total of ingredients being about 100 percent.

7. An intermediate transfer member in accordance with claim 1 wherein said copolymer is present in an amount of from about 80 to about 90 weight percent, the polysiloxane is present in an amount of from about 0.1 to about 0.5 weight percent, and the conductive filler component is present in an amount of from about 10 to about 20 weight percent, with the total of ingredients being about 100 percent.

8. An intermediate transfer member in accordance with claim 1 wherein the member has a resistivity of from about $10^9$ to about $10^{13}$ ohm/square, and wherein said member further includes a supporting substrate.

9. An intermediate transfer member in accordance with claim 1 wherein said conductive filler is a metal oxide, a polyaniline, or carbon black.

10. An intermediate transfer member comprising a polymer layer comprising a spirodilactam polycarbonate copolymer as represented by the following formulas/structures where wherein x is from about 6 to about 25 mole percent, and y is from about 75 to about 94 mole percent, and an optional conductive filler component.

11. An intermediate transfer member comprising a mixture of a copolymer of a spirodilactam polycarbonate and a polycarbonate, a polysiloxane, and a conductive filler component, and wherein said copolymer is represented by the following formulas/structures wherein x is from about 6 to about 20 mole percent, y is from about 80 to about 94 mole percent, and said polysiloxane is a copolymer of a polyester and a polydimethylsiloxane.

12. An intermediate transfer member in accordance with claim 11 wherein said copolymer possesses a weight average molecular weight of from about 75,000 to about 200,000 as determined by Gel Permeation Chromatography analysis.

13. An intermediate transfer member in accordance with claim 11 wherein said copolymer possesses a glass transition temperature of from about 215° C. to about 375° C.

14. An intermediate transfer member in accordance with claim 11 wherein said member possesses a modulus of from about 3,000 to about 5,500 Mega Pascals, and which mixture is readily releasable from a metal substrate.

* * * * *